US010281103B2

(12) United States Patent
Owada

(10) Patent No.: US 10,281,103 B2
(45) Date of Patent: May 7, 2019

(54) BODY AND LIGHTING TOOL FOR VEHICLE

(71) Applicant: Stanley Electric Co., Ltd., Tokyo (JP)

(72) Inventor: Ryotaro Owada, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/601,166

(22) Filed: May 22, 2017

(65) Prior Publication Data

US 2017/0343175 A1 Nov. 30, 2017

(30) Foreign Application Priority Data

May 24, 2016 (JP) ................................ 2016-103349

(51) Int. Cl.
*F21V 13/04* (2006.01)
*F21V 7/00* (2006.01)
(Continued)

(52) U.S. Cl.
CPC ................. *F21S 41/24* (2018.01); *B62J 6/02* (2013.01); *F21S 41/147* (2018.01); *F21S 41/19* (2018.01);
(Continued)

(58) Field of Classification Search
CPC ........ F21S 41/24; F21S 41/275; F21S 43/245; F21S 43/241; F21S 41/36; F21S 41/322;
(Continued)

(56) References Cited

U.S. PATENT DOCUMENTS 9,822,947 B2 * 11/2017 Owada ................. F21V 7/0091
2004/0156209 A1 8/2004 Ishida
(Continued)

FOREIGN PATENT DOCUMENTS

DE 102004005931 A1 8/2004
DE 102014205994 A1 10/2015
(Continued)

OTHER PUBLICATIONS

Extended European Search Report for the related European Patent Application No. 17172095.6 dated Oct. 27, 2017.

*Primary Examiner* — Tracie Y Green
(74) *Attorney, Agent, or Firm* — Kenealy Vaidya LLP

(57) ABSTRACT

A lens body is provided which is disposed in front of a light source and configured to emit light forward from the light source along a forward/rearward reference axis extending in a forward/rearward direction of a vehicle, the lens body including an incidence part; a first reflecting surface configured to totally reflect light entering from the incidence part; a second reflecting surface configured to totally reflect at least some of the light totally reflected by the first reflecting surface; and a light emitting surface, wherein the first reflecting surface includes an elliptical spherical shape rotatably symmetrical with respect to a major axis extending in the forward/rearward direction, in first and second focal points constituted by the elliptical shape of the first reflecting surface, the second focal point disposed at a rear side between the first and second focal points is disposed in the vicinity of the light source, the second reflecting surface extends rearward from a point spaced a predetermined distance from the first focal point in an upward direction, and, among the light totally reflected by the first reflecting surface, light reaching the light emitting surface without being reflected by the second reflecting surface and light reaching the light emitting surface after being totally reflected by the second reflecting surface are emitted from the light emitting surface to be radiated forward.

8 Claims, 12 Drawing Sheets

(51) Int. Cl.

| | |
|---|---|
| ***F21S 41/24*** | (2018.01) |
| ***B62J 6/02*** | (2006.01) |
| ***F21S 41/19*** | (2018.01) |
| ***F21S 41/147*** | (2018.01) |
| ***F21S 41/29*** | (2018.01) |
| ***F21S 41/255*** | (2018.01) |
| ***F21S 41/265*** | (2018.01) |
| ***F21S 41/275*** | (2018.01) |
| ***F21S 41/27*** | (2018.01) |
| ***F21S 41/32*** | (2018.01) |
| ***F21S 41/36*** | (2018.01) |
| ***F21S 43/241*** | (2018.01) |
| ***F21S 43/245*** | (2018.01) |
| *F21S 41/365* | (2018.01) |

(52) U.S. Cl.

CPC ........... *F21S 41/255* (2018.01); *F21S 41/265* (2018.01); *F21S 41/27* (2018.01); *F21S 41/275* (2018.01); *F21S 41/295* (2018.01); *F21S 41/322* (2018.01); *F21S 41/36* (2018.01); *F21S 43/241* (2018.01); *F21S 43/245* (2018.01); *F21S 41/365* (2018.01)

(58) Field of Classification Search

CPC ........ F21S 41/19; F21S 41/147; F21S 41/265; F21S 41/255; F21S 41/27; F21S 41/295; F21S 41/365; B62J 6/02

See application file for complete search history.

(56) References Cited

U.S. PATENT DOCUMENTS

| | | | | |
|---|---|---|---|---|
| 2015/0009700 | A1 | 1/2015 | Yamamoto | |
| 2017/0130923 | A1* | 5/2017 | Nishimura ............. | F21S 41/24 |

FOREIGN PATENT DOCUMENTS

| | | | |
|---|---|---|---|
| JP | 2005276805 | A | 10/2005 |
| JP | 4047186 | B2 | 2/2008 |
| JP | 2010170836 | A | 8/2010 |
| WO | 2016006138 | A1 | 1/2016 |

* cited by examiner

BODY AND LIGHTING TOOL FOR VEHICLE

BACKGROUND OF THE INVENTION

Field of the Invention

The present invention relates to a lens body and a lighting tool for a vehicle.

Priority is claimed on Japanese Patent Application No. 2016-103349, filed May 24, 2016, the content of which is incorporated herein by reference.

Description of Related Art

In the related art, a lighting tool for a vehicle in which a light source and a lens body are combined has been proposed (for example, Japanese Patent No. 4047186). In the lighting tool for a vehicle, light from the light source enters into the lens body from an incidence part of the lens body, some of the light is reflected by a reflecting surface of the lens body, and then the light exits to the outside of the lens body through a light emitting surface of the lens body.

SUMMARY OF THE INVENTION

In a lighting tool for a vehicle of the related art, a metal reflective film (a reflecting surface) is formed on a surface of a lens body through metal deposition, and light reflected by the metal reflective film is radiated forward. For this reason, loss of light may occur in the reflecting surface to decrease utilization efficiency of the light.

An object of the present invention is directed to provide a lens body using light from a light source efficiently.

An aspect of the present invention provides a lens body disposed in front of a light source and configured to emit light forward from the light source along a forward/rearward reference axis extending in a forward/rearward direction of a vehicle, the lens body including: an incidence part configured to cause light from the light source to enter an inside of the lens body; a first reflecting surface configured to totally reflect the light entering from the incidence part; a second reflecting surface configured to totally reflect at least some of the light totally reflected by the first reflecting surface; and a light emitting surface configured to emit the light forward passing through the inside, wherein the first reflecting surface includes an elliptical spherical shape rotatably symmetrical with respect to a major axis extending in the forward/rearward direction, in first and second focal points constituted by the elliptical spherical shape of the first reflecting surface, the second focal point disposed at a rear side between the first and second focal points is disposed near the light source, the second reflecting surface extends rearward from a point spaced a predetermined distance from the first focal point in an upward direction, and, among the light totally reflected by the first reflecting surface, light reaching the light emitting surface without being reflected by the second reflecting surface and light reaching the light emitting surface after being totally reflected by the second reflecting surface are emitted from the light emitting surface to be radiated forward.

According to the above-mentioned configuration, among the light from the light source in the incidence part, light within a predetermined angular range with respect to an optical axis of the light source (for example, light having a high relative intensity within a range of ±60°) is refracted in a concentrating direction to enter the lens body. Accordingly, an incident angle of the light within the predetermined angular range with respect to the first reflecting surface may be a critical angle or more. Further, in the above-mentioned configuration, as the optical axis of the light source is inclined with respect to a vertical axis, the incident angle of the light from the light source entering the lens body with respect to the first reflecting surface is the critical angle or more. That is, according to the above-mentioned configuration, since the light from the light source enters the first reflecting surface at the incident angle of the critical angle or more, a reduction in cost can be achieve without a need for metal deposition on the first reflecting surface, and reflection loss occurring in a vapor deposited surface can be reduced to increase the utilization efficiency of light.

In addition, according to the above-mentioned configuration, the lens body has the second reflecting surface extending rearward from the point spaced the predetermined distance from the first focal point in the upward direction. Among the light internally reflected by the first reflecting surface, the second reflecting surface reflects light passing above the first focal point downward. When the light passing above the first focal point enters the light emitting surface without being reflected by the second reflecting surface, the light is emitted downward from the light emitting surface. Since the second reflecting surface is formed, the optical path of the light can be reversed and the light can be emitted upward from the light emitting surface. That is, according to the above-mentioned configuration, a light distribution pattern including a cutoff line can be formed at a lower edge thereof. When the lens body including the light distribution pattern in which the cutoff line is formed at the lower edge is used as a lighting tool for a vehicle, brightness of a road surface near the vehicle corresponding to a region below the cutoff line can be suppressed. When the road surface near the vehicle is too bright, a driver perceives that a region far from the vehicle is relatively dark. Since the brightness near the vehicle is suppressed, a light distribution pattern that causes the region far from the vehicle to be perceived as sufficiently bright can be realized. Such a light distribution pattern may be employed as, for example, a light distribution pattern for a high beam or a light distribution pattern for a fog lamp.

In the above-mentioned lens body, the light emitting surface may have: a convex shape having an optical axis parallel to the forward/rearward reference axis in a cross section along a surface perpendicular to a leftward/rightward direction of the vehicle using a point disposed near the first focal point as a light emitting surface focal point; and a first leftward/rightward emission region and a second leftward/rightward emission region neighboring each other in the leftward/rightward direction in a cross section along a surface perpendicular to an upward/downward direction of the vehicle, the first leftward/rightward emission region may refract light entering and passing through the first focal point in a direction approaching the forward/rearward reference axis, and the second leftward/rightward emission region may refract the light entering and passing through the first focal point in a direction receding from the forward/rearward reference axis.

According to the above-mentioned configuration, the first leftward/rightward emission region and the second leftward/rightward emission region are formed in cross sections in the forward/rearward direction and the leftward/rightward direction of the light emitting surface. The light entering the light emitting surface pass near the first focal point because the light is reflected by the elliptically-spherically-shaped-first reflecting surface. The first leftward/rightward emission region refracts and emits the light entering and passing through the first focal point in a direction approaching the forward/rearward reference axis extending forward and rearward. Meanwhile, the second leftward/rightward emission region refracts and emits the light entering and passing through the first focal point in a direction extending receding from the forward/rearward reference axis forward and rearward. That is, according to the above-mentioned configuration, since regions that emit light in different left and right directions are formed at the light emitting surface, light can be widely radiated in the leftward/rightward direction.

In the above-mentioned lens body, the light emitting surface may have a surface shape configured such that the light passing near the first focal point is emitted in a direction substantially parallel to the forward/rearward reference axis in at least a vertical direction.

According to the above-mentioned configuration, a surface shape of the light emitting surface is configured such that the light passing through the light emitting surface focal point is emitted in the direction substantially parallel to the forward/rearward reference axis. The light distribution pattern formed by the lens body has a cutoff line extending beyond the forward/rearward reference axis. According to the above-mentioned configuration, a region having a largest illuminance can be formed by relatively brightening the vicinity of the cutoff line.

In the above-mentioned lens body, the second leftward/rightward emission region may constitute a concave shape in which a central portion thereof is recessed when seen in the upward/downward direction, and the first leftward/rightward emission region may constitute convex shapes disposed at both sides of the second leftward/rightward emission region in the leftward/rightward direction.

According to the above-mentioned configuration, in the light emitting surface, the second leftward/rightward emission region is disposed such that a central side overlapping the forward/rearward reference axis has a concave shape when seen from the upward/downward direction, and the first leftward/rightward emission region is disposed such that convex shapes are formed at both left and right sides of the second leftward/rightward emission region. Accordingly, light can be widely radiated toward both left and right sides with respect to the forward/rearward reference axis.

In the above-mentioned lens body, a distance and eccentricity between the first focal point and the second focal point of the first reflecting surface, an angle of a major axis of the first reflecting surface with respect to the forward/rearward reference axis and an angle of an optical axis of the light source with respect to the forward/rearward reference axis may be set to totally reflect light using the first reflecting surface.

According to the above-mentioned configuration, since a larger amount of light can be captured by the light emitting surface, the light utilization efficiency is improved.

In the above-mentioned lens body, the major axis of the first reflecting surface may be inclined with respect to the forward/rearward reference axis and the second focal point is disposed under the first focal point.

According to the above-mentioned configuration, as the major axis is inclined while the second focal point side is directed downward, among the light from the light source, the light internally reflected by the first reflecting surface and second reflecting surface is likely to be captured by the light emitting surface. In addition, according to the above-mentioned configuration, since an incident angle of the light entering the first reflecting surface from the light source is likely to be the critical angle or more, the total reflection by the first reflecting surface can be easily realized. According to the above-mentioned configuration, the utilization efficiency of light can be increased by these actions.

In the above-mentioned lens body, the second reflecting surface may have an angle set with respect to the forward/rearward reference axis such that, among the light totally reflected by the first reflecting surface, the light totally reflected by the second reflecting surface is captured by the light emitting surface.

According to the above-mentioned configuration, since a larger amount of light can be captured by the light emitting surface, the light utilization efficiency is improved.

In the above-mentioned lens body, the second reflecting surface may have an angle with respect to the forward/rearward reference axis and a length in the forward/rearward direction which are set such that light reaching the light emitting surface and totally reflected by the first reflecting surface without being totally reflected by the second reflecting surface is not blocked.

According to the above-mentioned configuration, since a larger amount of light can be captured by the light emitting surface, the light utilization efficiency is improved.

A lighting tool for a vehicle of the present invention includes the lens body and the light source.

According to the above-mentioned configuration, a lighting tool for a vehicle capable of exhibiting the above-mentioned effects can be provided.

According to the aspect of the present invention, a lens body that can be employed for a lighting tool for a vehicle capable of effectively distributing light in a leftward/rightward direction while highly efficiently using light from a light source and a lighting tool for a vehicle including the same can be provided.

DETAILED DESCRIPTION OF THE INVENTION

First Embodiment

Figure 1:
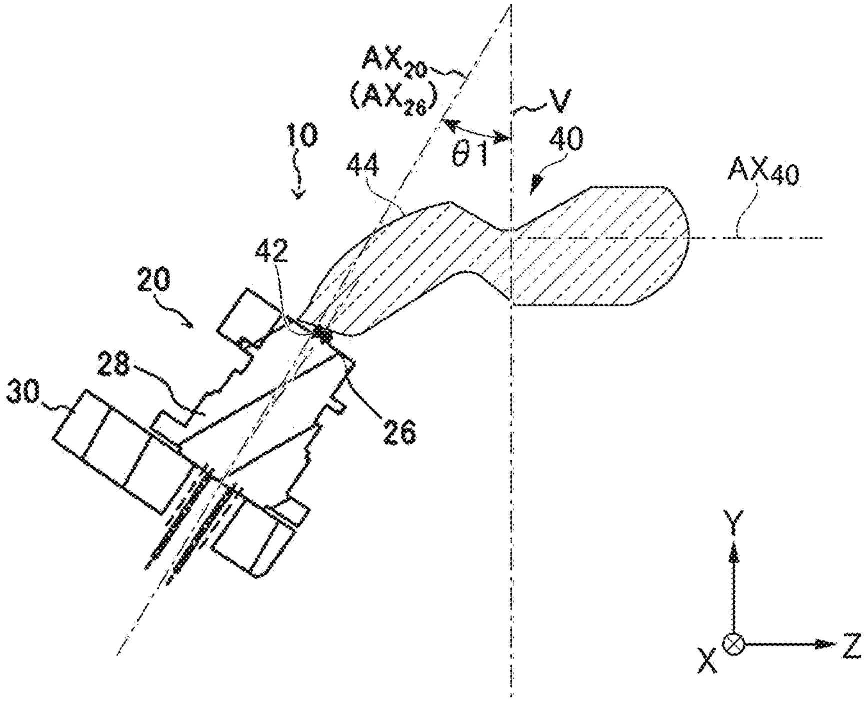
FIG. 1 is a cross-sectional view of a lighting tool for a vehicle of an embodiment.

Hereinafter, a lens body 40 and a lighting tool 10 for a vehicle including the lens body 40 serving as an embodiment of the present invention will be described with reference to the accompanying drawings.

In the following description, a forward/rearward direction refers to a forward/rearward direction of a vehicle on which the lens body 40 or the lighting tool 10 for a vehicle is mounted, and the lighting tool 10 for a vehicle is a member configured to radiate light forward. Further, the forward/rearward direction is one direction in a horizontal surface unless indicated otherwise by context. Further, a leftward/rightward direction is one direction in the horizontal surface and is a direction perpendicular to the forward/rearward direction unless indicated otherwise by context.

In the specification, extending in the forward/rearward direction (or extending forward/rearward) also includes extending in a direction inclined within a range of less than 45° with respect to the forward/rearward direction in addition to extending strictly in the forward/rearward direction. Similarly, in the specification, extending in the leftward/rightward direction (or extending leftward/rightward) also includes extending in a direction inclined within a range of less than 45° with respect to the leftward/rightward direction in addition to extending strictly in the leftward/rightward direction.

In addition, in the drawings, an XYZ coordinate system serving as an appropriate three-dimensional orthogonal coordinate system is shown. In the XYZ coordinate system, a Y-axis direction is an upward/downward direction (a vertical direction), and a +Y direction is the upward direction. In addition, a Z-axis direction is the forward/rearward direction, and a +Z direction is the forward direction (a front side). Further, an X-axis direction is the leftward/rightward direction.

Further, the drawings used in the following description may show enlarged characterized parts for convenience in order to allow an easy understanding of the characterized parts, and dimensional ratios or the like of components may not be equal to their actual dimensional ratios.

In addition, in the following description, the case in which two points are "disposed adjacent to each other" includes the case in which two points coincide with each other as well as the case in which two points are simply disposed close to each other.

FIG. 1 is a cross-sectional view of the lighting tool 10 for a vehicle. In addition, FIG. 2 is a partial cross-sectional view of the lighting tool 10 for a vehicle.

As shown in FIG. 1, the lighting tool 10 for a vehicle includes the lens body 40, a light emitting device 20, and a heat sink 30 configured to cool the light emitting device 20. The lighting tool 10 for a vehicle emits light radiated from the light emitting device 20 toward a forward side thereof via the lens body 40.

Figure 2:
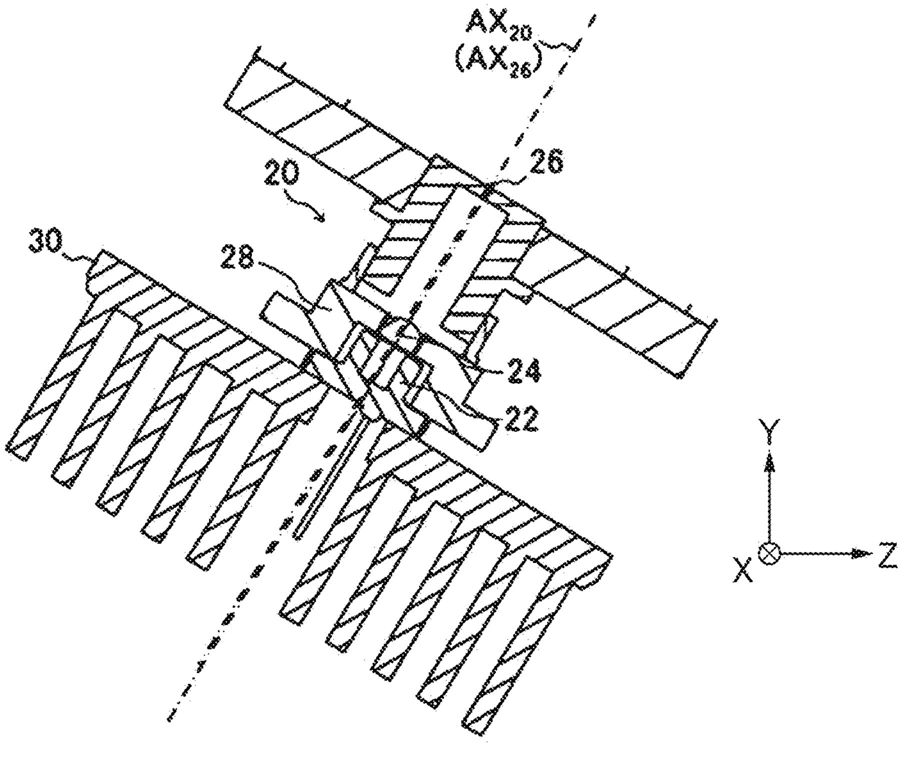
FIG. 2 is a partial cross-sectional view of the lighting tool for a vehicle of the first embodiment.

As shown in FIG. 2, the light emitting device 20 radiates light along an optical axis $AX_{20}$. The light emitting device 20 has a semiconductor laser element 22, a condensing lens 24, a wavelength conversion member (a light source) 26, and a holding member 28 configured to hold these. The semiconductor laser element 22, the condensing lens 24, and the wavelength conversion member 26 are sequentially disposed along the optical axis $AX_{20}$.

The semiconductor laser element 22 is a semiconductor laser light source such as a laser diode or the like configured to discharge laser beams of a blue area (for example, an emission wavelength thereof is 450 nm). The semiconductor laser element 22 is mounted on, for example, a CAN type package and sealed therein. The semiconductor laser element 22 is held by the holding member 28 such as a holder or the like. Further, as another embodiment, a semiconductor emitting device such as an LED device or the like may be used instead of the semiconductor laser element 22.

The condensing lens 24 concentrates laser beams from the semiconductor laser element 22. The condensing lens 24 is disposed between the semiconductor laser element 22 and the wavelength conversion member 26.

The wavelength conversion member 26 is constituted by, for example, a fluorescent body of a rectangular plate shape having a light emitting size of 0.4×0.8 mm. The wavelength conversion member 26 is disposed at, for example, a position spaced about 5 to 10 mm away from the semiconductor laser element 22. The wavelength conversion member 26 receives the laser beams concentrated by the condensing lens 24 and converts at least some of the laser beams into light having a different wavelength. More specifically, the wavelength conversion member 26 converts the laser beams of a blue area into yellow light. The yellow light converted by the wavelength conversion member 26 is mixed with laser beams of the blue area passing through the wavelength conversion member 26 and discharged as white light (quasi white light). Accordingly, the wavelength conversion member 26 functions as a light source configured to discharge white light. Hereinafter, the wavelength conversion member 26 is referred to as the light source 26.

The light radiated from the light source 26 enters an incident surface 42, which will be described below, to propagate through the lens body 40, and is internally reflected by a first reflecting surface 44 (see FIG. 1) which will be described below.

An optical axis $AX_{26}$ of the light source 26 coincides with the optical axis $AX_{20}$ of the light emitting device 20. As shown in FIG. 1, the optical axis $AX_{26}$ is inclined at an angle $\theta 1$ with respect to a vertical axis V extending in a vertical direction (a Z-axis direction). Accordingly, the optical axis $AX_{26}$ is inclined by an angle of $90°-\theta 1$ with respect to a forward/rearward reference axis $AX_{40}$ extending in a forward/rearward direction of the vehicle. The angle $\theta 1$ of the optical axis $AX_{26}$ with respect to the vertical axis V is set such that an incident angle of light from the light source entering into the lens body 40 from the incident surface 42 with respect to the first reflecting surface 44 is a critical angle or more.

Figure 3A:
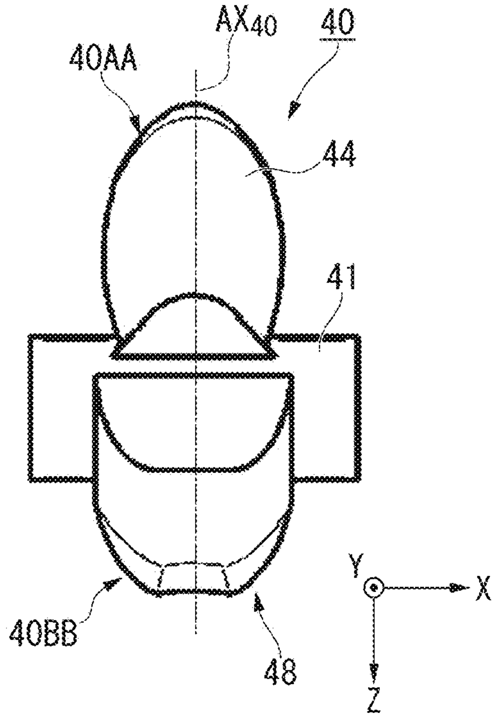
FIG. 3A is a plan view of a lens body of the first embodiment.
Figure 3C:
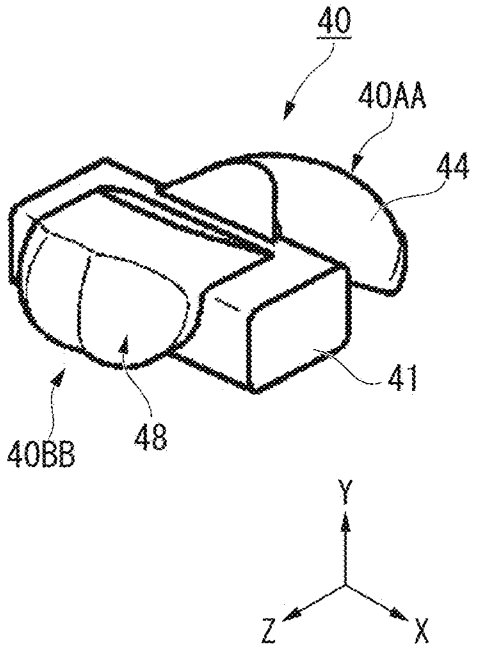
FIG. 3C is a perspective view of the lens body of the first embodiment.
Figure 3B:
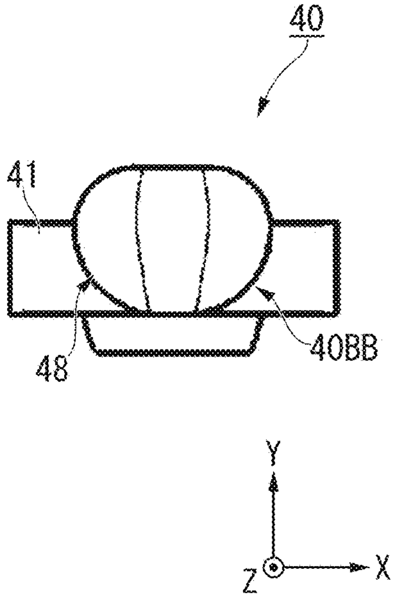
FIG. 3B is a front view of the lens body of the first embodiment.
Figure 3D:
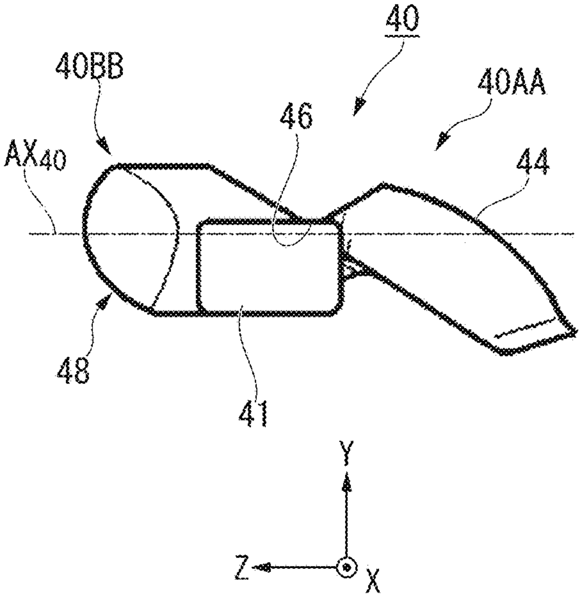
FIG. 3D is a side view of the lens body of the first embodiment.
Figure 4:
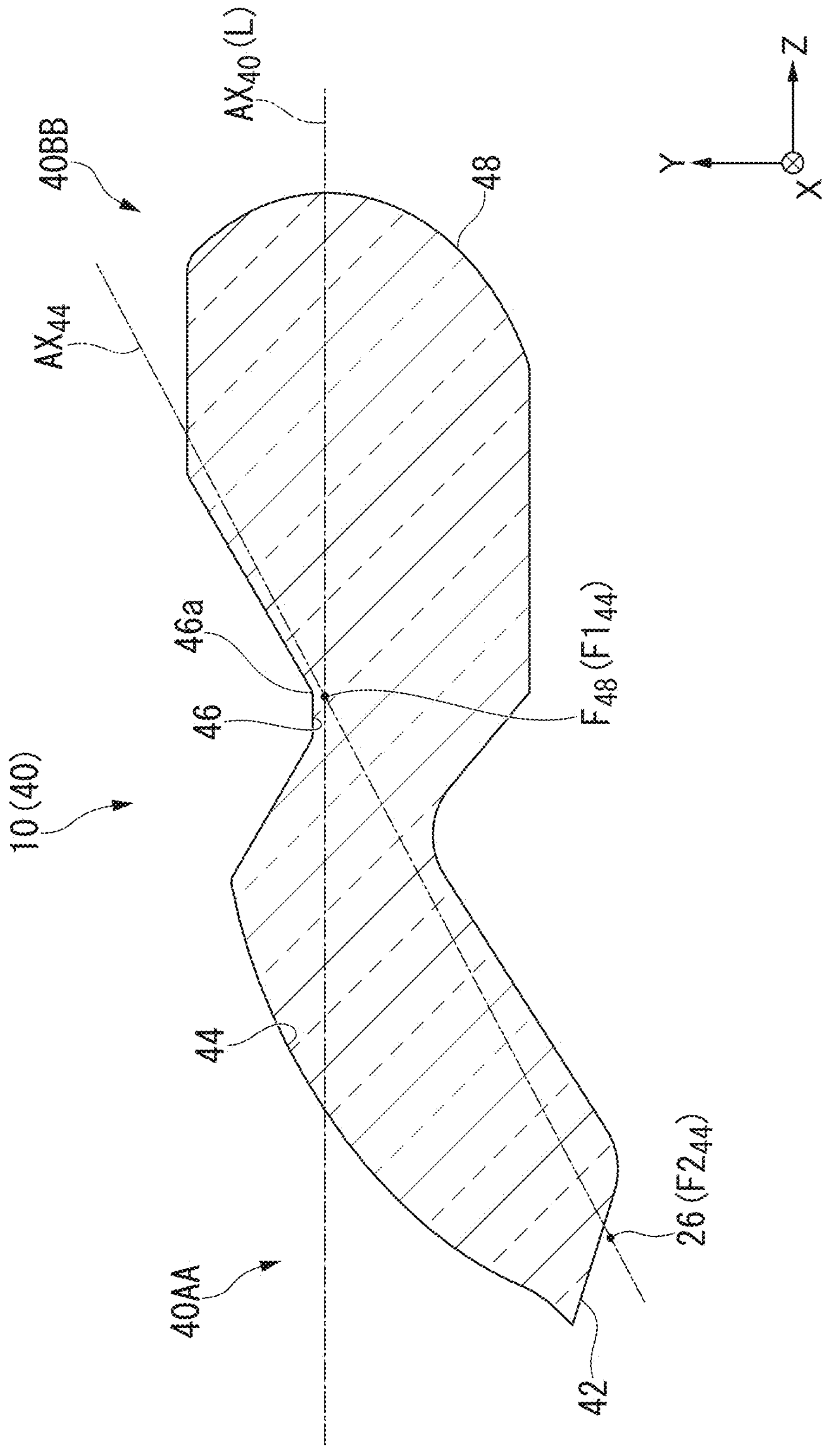
FIG. 4 is a cross-sectional view of the lens body along a YZ plane of the first embodiment.

FIG. 3A is a plan view of the lens body 40, FIG. 3B is a front view of the lens body 40, FIG. 3C is a perspective view of the lens body 40, and FIG. 3D is a side view of the lens body 40. FIG. 4 is a cross-sectional view of the lens body 40 along an YZ plane.

The lens body 40 is a solid multi-faced lens body having a shape extending along the forward/rearward reference axis $AX_{40}$. Further, in the embodiment, the forward/rearward reference axis $AX_{40}$ is an axis extending in the forward/rearward direction (an X-axis direction) of the vehicle and serving as a reference line passing through a center of a light emitting surface 48 of the lens body 40, which will be described below. The lens body 40 is disposed in front of the light source 26. The lens body 40 includes a rear end portion 40AA facing rearward, and a front end portion 40BB facing forward. In addition, as shown in FIGS. 3A to 3D, the lens body 40 has a fixing section 41 extending in the leftward/rightward direction between the front end portion 40BB and the rear end portion 40AA. The lens body 40 is fixed to the vehicle at the fixing section 41.

The lens body 40 can be formed of a material having a higher refractive index than that of air, for example, a transparent resin such as polycarbonate, acryl, or the like, or glass or the like. In addition, when a transparent resin is used as the lens body 40, the lens body 40 can be formed through injecting molding using a mold.

The lens body 40 has the incident surface (an incidence part) 42, the first reflecting surface 44, a second reflecting surface 46, and the light emitting surface 48. The incident surface 42 and the first reflecting surface 44 are disposed at the rear end portion 40AA of the lens body 40. In addition, the light emitting surface 48 is disposed at the front end portion 40BB of the lens body 40. The second reflecting surface 46 is disposed between the rear end portion 40AA and the front end portion 40BB.

The lens body 40 emits light, which is from the light source 26 entering the lens body 40 from the incident surface 42 disposed at the rear end portion 40AA, forward from the light emitting surface 48 disposed at the front end portion 40BB along the forward/rearward reference axis $AX_{40}$.

Figure 5A:
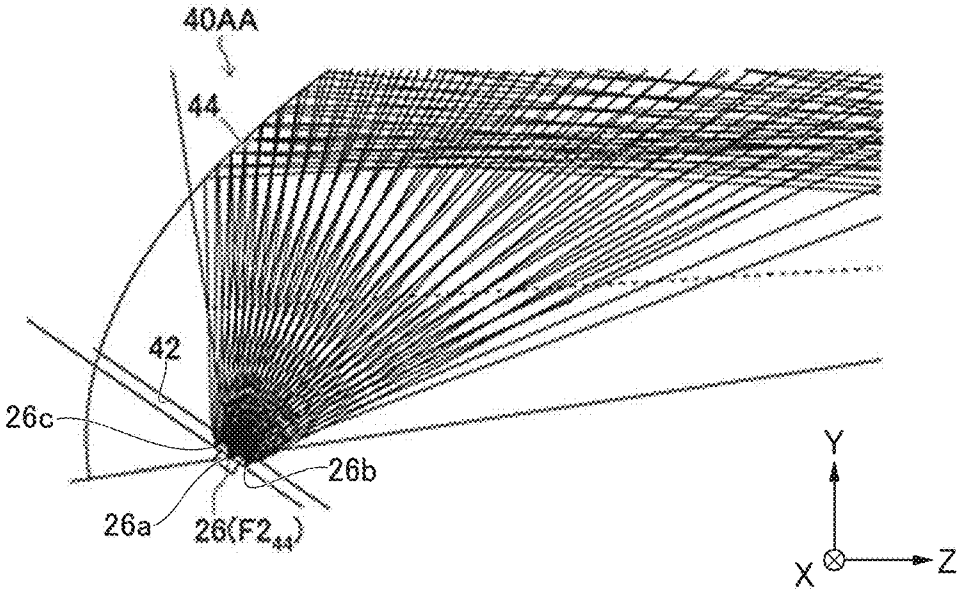
FIG. 5A is a partially enlarged view of a light source and the vicinity of an incident surface of the lens body of the first embodiment.

FIG. 5A is a partially enlarged view of the vicinity of the light source 26 and the incident surface 42 of the lens body 40.

The light source 26 has a light emitting surface with a predetermined area. For this reason, light radiated from the light source 26 is radially spread from points in the light emitting surface. Light passing through the lens body 40 follows different optical paths according to light emitted from the points in the light emitting surface. In the specification, description will be performed in consideration of the optical path of light radiated from a light source central point 26*a* serving as a center of the light emitting surface (i.e., a center of the light source 26), a light source front end point 26*b* serving as an end point of a forward side, and a light source rear end point 26*c* serving as an end point of a rearward side.

Figure 5B:
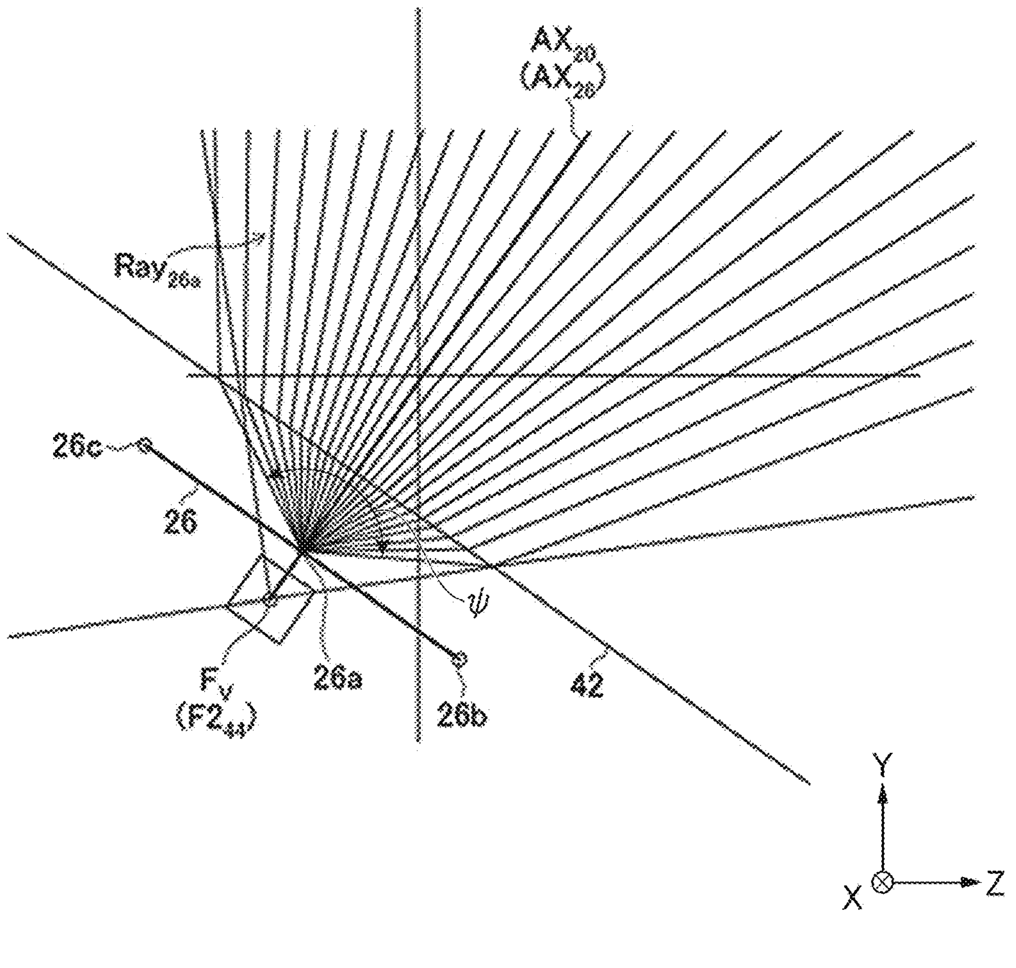
FIG. 5B is an enlarged view of a portion of FIG. 5A.

FIG. 5B is a view showing a route of the light emitted from the light source central point 26*a*, which is an enlarged view of a portion of FIG. 5A. In the specification, an intersection when light refracted from the light source central point 26*a* at the incident surface 42 and entering the lens body 40 extends in opposite directions is set as an imaginary light source position $F_V$. The imaginary light source position $F_V$ is a position of a light source provided that the light source is integrally disposed in the lens body 40. Further, in the embodiment, since the incident surface 42 is a plane but not a lens surface, the light entering the lens body 40 does not cross itself at one point even when the light extends in opposite directions. More specifically, the light crosses at a rearward side on an optical axis L as it recedes from the optical axis L. For this reason, the intersection at which an optical path closest to the optical axis L is crossed is the imaginary light source position $F_V$.

As shown in FIG. 5B, the incident surface 42 is a surface at which light in a predetermined angular range ψ among light $Ray_{26a}$ from the light source 26 is refracted in a concentrating direction to enter the lens body 40. Here, the light of the predetermined angular range ψ is light having relatively high intensity within a range of, for example, ±60° with respect to the optical axis $AX_{26}$ of the light source 26 from the light radiated from the light source 26. In the embodiment, the incident surface 42 is configured as a surface with a planar shape (or a curved surface shape) parallel to the light emitting surface of the light source 26 (in FIG. 5B, see a straight line that connects the light source front end point 26*b* and the light source rear end point 26*c*). Further, a configuration of the incident surface 42 is not limited to the configuration of the embodiment. For example, the incident surface 42 may have a cross-sectional shape in a vertical surface (and a plane parallel thereto) including the forward/rearward reference axis $AX_{40}$, which is a linear shape, and a cross-sectional shape in a plane perpendicular to the forward/rearward reference axis $AX_{40}$, which is an arc-shaped surface concave toward the light source 26, but may also have other surfaces. The cross-sectional shape in the plane perpendicular to the forward/rearward reference axis $AX_{40}$ is a shape obtained in consideration of a distribution of a high beam light distribution pattern PA in the leftward/rightward direction.

Figure 6:
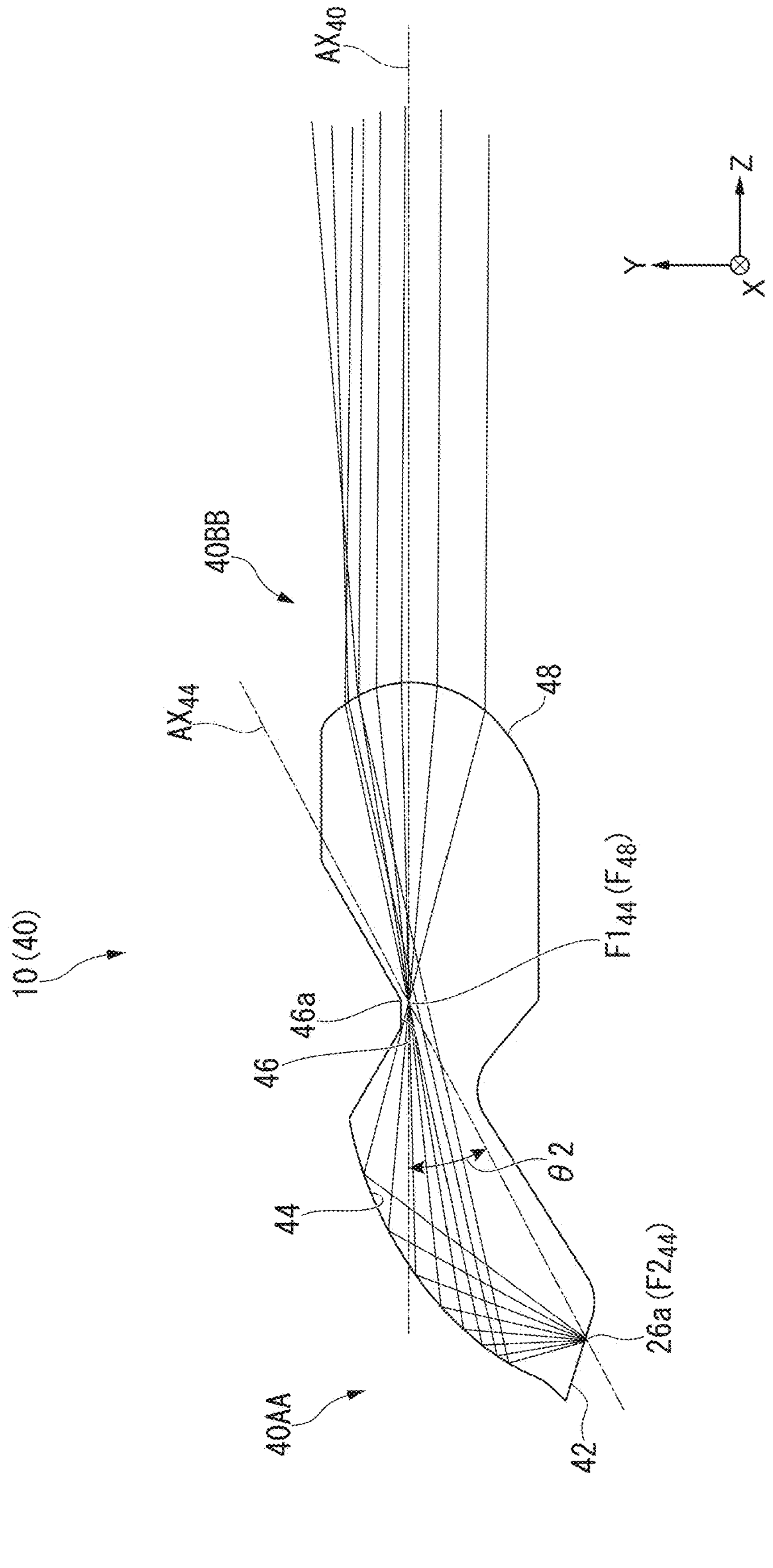
FIG. 6 is a cross-sectional schematic view of the lens body of the first embodiment and shows an optical path of light radiated from a central point of the light source.
Figure 7:
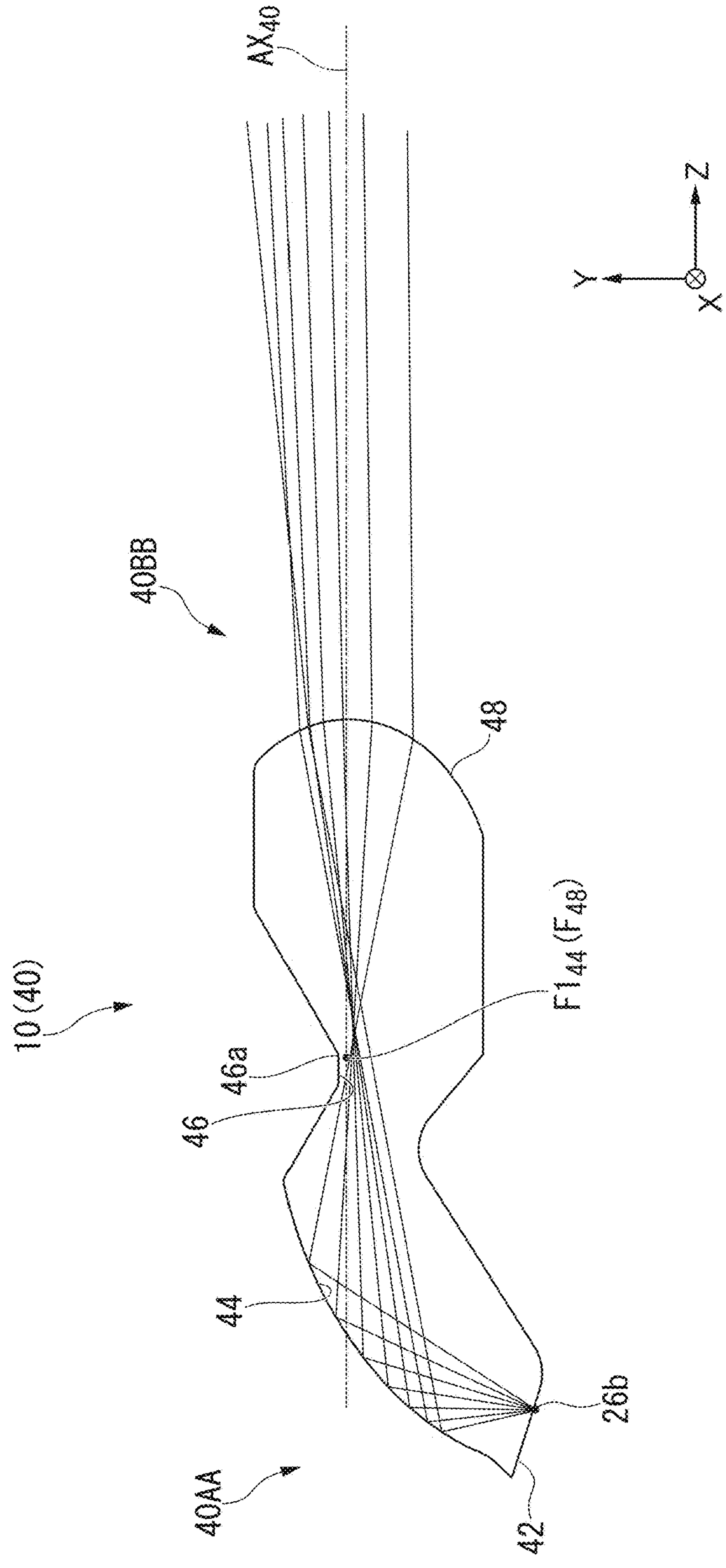
FIG. 7 is a cross-sectional schematic view of the lens body of the first embodiment and shows an optical path of light radiated from a front end point of the light source.
Figure 8:
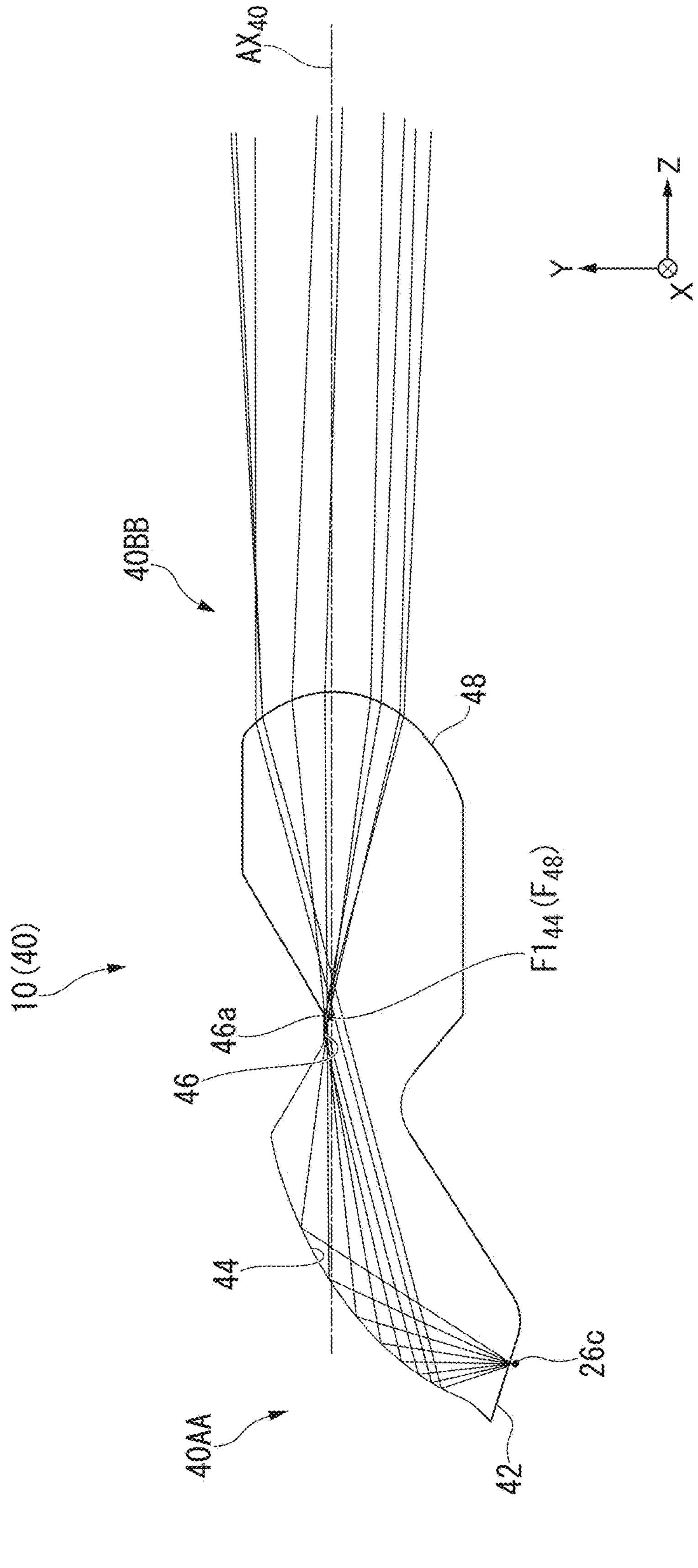
FIG. 8 is a cross-sectional schematic view of the lens body of the first embodiment and shows an optical path of light radiated from a rear end point of the light source.

FIGS. 6 to 8 are cross-sectional schematic views of the lens body 40, FIG. 6 shows an optical path of light radiated from the light source central point 26*a*, FIG. 7 shows an optical path of light radiated from the light source front end point 26*b*, and FIG. 8 shows an optical path of light radiated from the light source rear end point 26*c*.

As shown in FIG. 6, the light radiated from the light source central point 26*a* is internally reflected by the first reflecting surface 44 to be mainly concentrated at a first focal point $F1_{44}$ and is then directed forward from the light emitting surface 48 to be emitted to be parallel to the forward/rearward reference axis $AX_{40}$.

As shown in FIG. 7, the light radiated from the light source front end point 26*b* is internally reflected by the first reflecting surface 44 to pass farther downward therethrough than the first focal point $F1_{44}$ and is emitted forward and upward from the light emitting surface 48.

As shown in FIG. 8, the light radiated from the light source rear end point 26*c* is internally reflected by the first reflecting surface 44 to pass farther upward therethrough than the first focal point $F1_{44}$. Further, the light is internally reflected downward by the second reflecting surface 46 disposed over the first focal point $F1_{44}$ and is then emitted forward and downward from the light emitting surface 48.

Hereinafter, components of the lens body 40 will be described based on FIGS. 6 to 8.

<First Reflecting Surface>

The first reflecting surface 44 is a surface configured to internally reflect (totally reflect) light from the light source 26 entering the lens body 40 from the incident surface 42. The first reflecting surface 44 includes an elliptical spherical shape that is rotationally symmetrical with respect to a major axis $AX_{44}$ extending in the forward/rearward direction. The elliptical shape of the first reflecting surface 44 constitutes the first focal point $F1_{44}$ and a second focal point $F2_{44}$ on the major axis $AX_{44}$.

The second focal point $F2_{44}$ is an elliptical focus disposed behind the first focal point $F1_{44}$.

The second focal point $F2_{44}$ is disposed near the imaginary light source position $F_V$. That is, the second focal point $F2_{44}$ is disposed near the light source 26. Light radiated from one of the focal points is concentrated to the other focal point due to properties of an ellipse. Accordingly, as shown in FIG. 6, the light radiated from the light source central point 26*a* progresses through the lens body 40 via the incident surface 42 to be concentrated at the first focal point $F1_{44}$. The first focal point $F1_{44}$ is disposed near a light emitting surface focal point $F_{48}$ of the light emitting surface 48, which will be described below. Accordingly, the first reflecting surface 44 has a surface shape configured such that the internally reflected light from the light source central point 26*a* is concentrated at the vicinity of the light emitting surface focal point $F_{48}$ of the light emitting surface 48.

The distance and eccentricity between the first focal point $F1_{44}$ of the first reflecting surface 44 and the second focal point $F2_{44}$, an angle of the major axis $AX_{44}$ of the first reflecting surface 44 with respect to the forward/rearward reference axis $AX_{40}$ (an angle θ2 to be described in the following paragraphs) and an angle (the above-mentioned 90°−θ1) of the optical axis $AX_{26}$ of the light source 26 with respect to the forward/rearward reference axis $AX_{40}$ are set to be totally reflected in the first reflecting surface 44. Further, these are determined such that the light from the light source 26 internally reflected by the first reflecting surface 44 and concentrated at the vicinity of the light emitting surface focal point $F_{48}$ of the light emitting surface 48 is captured by the light emitting surface 48. Accordingly, a larger amount of light can be captured by the light emitting surface 48, and the light utilization efficiency is improved.

As shown in FIG. 6, the major axis $AX_{44}$ is inclined by the angle θ2 with respect to the forward/rearward reference axis $AX_{40}$. The major axis $AX_{44}$ is inclined upward as it goes forward such that the second focal point $F2_{44}$ is disposed below the first focal point $F1_{44}$. As the major axis $AX_{44}$ is inclined while the second focal point $F2_{44}$ side is directed downward, an angle of the light internally reflected by the first reflecting surface 44 with respect to the forward/rearward reference axis $AX_{40}$ is shallow. Accordingly, light radiated from the light source front end point 26*b* and internally reflected by the first reflecting surface 44 can be easily captured by the light emitting surface 48. Accordingly, in comparison with the case in which the major axis $AX_{44}$ is not inclined with respect to the forward/rearward reference axis $AX_{40}$ (i.e., when the angle θ2=0°, size of the light emitting surface 48 can be reduced and a larger amount of light can be captured by the light emitting surface 48. In addition, since the major axis $AX_{44}$ is inclined while the second focal point $F2_{44}$ side is directed downward, an incident angle of the light entering the first reflecting surface 44 from the light source 26 is likely to be increased to the critical angle or more. Accordingly, the light emitted from the light source 26 is likely to be totally reflected by the first reflecting surface 44, and the utilization efficiency of the light can be increased.

<Second Reflecting Surface>

The second reflecting surface 46 is a surface configured to internally reflect (totally reflect) at least some of the light from the light source 26 internally reflected by the first reflecting surface 44. The second reflecting surface 46 is configured as a reflecting surface extending rearward from a point spaced a predetermined distance from the first focal point $F1_{44}$ in an upward direction. In the embodiment, the second reflecting surface 46 has a planar shape extending in parallel to the forward/rearward reference axis $AX_{40}$.

As shown in FIG. 8, among the light internally reflected by the first reflecting surface 44, the second reflecting surface 46 reflects some light so that the light passes above the first focal point $F1_{44}$ in a downward direction. When the light passing above the first focal point $F1_{44}$ enters the light emitting surface 48 without the light reflected by the second reflecting surface 46, the light is emitted downward from the light emitting surface 48. Since the second reflecting surface 46 is formed, the optical path of the light can be reversed and the light can enter below the light emitting surface 48 to be emitted upward. That is, the lens body 40 can reverse the optical path of the light to be directed downward from the light emitting surface 48 and form a light distribution pattern including a cutoff line CL at a lower edge thereof by forming the second reflecting surface 46. A front edge 46*a* of the second reflecting surface 46 includes an edge shape configured to shield some of the light from the light source 26 internally reflected by the first reflecting surface 44 to form the cutoff line CL of the high beam light distribution pattern PA. The front edge 46*a* of the second reflecting surface 46 is disposed near the first focal point $F1_{44}$.

The second reflecting surface 46 may be parallel to or inclined with respect to the forward/rearward reference axis $AX_{40}$. Here, an angle of the second reflecting surface 46 with respect to the forward/rearward reference axis $AX_{40}$ will be described as an angle θ3 (not shown). Further, in the embodiment, the angle θ3=0°.

<Light Emitting Surface>

The light emitting surface 48 is a convex lens surface that protrudes forward. The light emitting surface 48 emits light passing therethrough (i.e., light internally reflected by the first reflecting surface 44 and light internally reflected by the first reflecting surface 44 and the second reflecting surface 46) forward.

As shown in FIG. 4, the light emitting surface 48 is configured as a convex shape (a convex lens shape) in a cross section along a surface (an XZ plane) perpendicular to a leftward/rightward direction of the vehicle. The light emitting surface 48 configures the light emitting surface focal point $F_{48}$ disposed near the first focal point $F1_{44}$. Accordingly, the light of a plurality of optical paths internally reflected by the first reflecting surface 44 and concentrated at the first focal point $F1_{44}$ are emitted parallel to each other in at least the vertical direction as the lights enter the light emitting surface 48.

In addition, in the embodiment, the light emitting surface 48 has the optical axis L that coincides with the forward/rearward reference axis $AX_{40}$. Further, as long as the optical axis L is parallel to the forward/rearward reference axis $AX_{40}$, the optical axis L of the light emitting surface 48 may not coincide with the forward/rearward reference axis $AX_{40}$. Accordingly, the light passing through the light emitting surface focal point $F_{48}$ and entering the light emitting surface 48 is emitted in parallel to the forward/rearward reference axis $AX_{40}$ with respect to at least the vertical direction. That is, the light emitting surface 48 is configured to have a shape such that the light passing through the vicinity of the first focal point $F1_{44}$ is emitted in a direction substantially parallel to the forward/rearward reference axis $AX_{40}$ with respect to at least the vertical direction.

Figure 9:
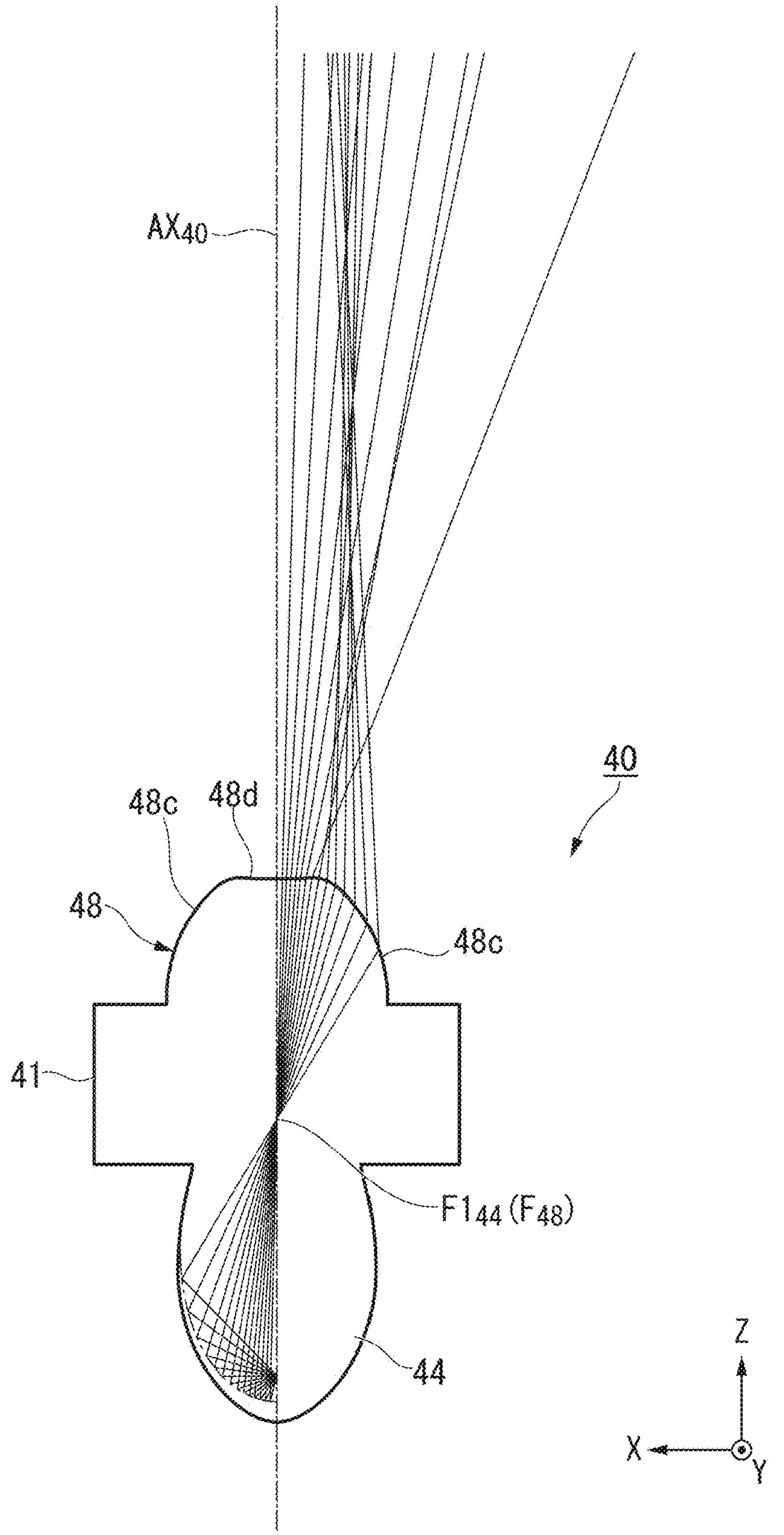
FIG. 9 is a cross-sectional view along an XZ plane of the lens body of the first embodiment.

FIG. 9 is a cross-sectional view along an XY plane of the lens body 40 and showing an optical path of light radiated from the light source central point 26*a*.

As shown in FIG. 9, in a cross section along a surface (the XY plane) perpendicular to the upward/downward direction, the lens body 40 has two first leftward/rightward emission regions 48*c* and a second leftward/rightward emission region 48*d*. The first leftward/rightward emission regions 48*c* and the second leftward/rightward emission region 48*d* are adjacent to each other in the leftward/rightward direction. More specifically, the second leftward/rightward emission region 48*d* is disposed at a center of the light emitting surface 48 when seen from the upward/downward direction, and the first leftward/rightward emission regions 48*c* are disposed at both sides in the leftward/rightward direction of the second leftward/rightward emission region 48*d*.

In addition, the cross section along the surface (the XY plane) perpendicular to the upward/downward direction of the light emitting surface 48 constituted by the first leftward/rightward emission regions 48*c* and the second leftward/rightward emission region 48*d* has a shape bilaterally symmetrical with respect to the forward/rearward reference axis $AX_{40}$.

The first leftward/rightward emission regions 48*c* constitute a convex shape (a convex lens shape). The first leftward/rightward emission regions 48*c* refract light entering and passing through the first focal point $F1_{44}$ in a direction approaching the forward/rearward reference axis $AX_{40}$.

The second leftward/rightward emission region 48*d* constitutes a concave shape (a concave lens shape) recessed at a central portion thereof when seen from the upward/downward direction. More specifically, the second leftward/rightward emission region 48*d* constitutes a concave shape in which a position overlapping the forward/rearward reference axis $AX_{40}$ is most deeply recessed when seen from the upward/downward direction. The second leftward/rightward emission region 48*d* refracts the light entering and passing through the first focal point $F1_{44}$ in a direction receding from the forward/rearward reference axis $AX_{40}$.

The light entering the light emitting surface 48 passes through the vicinity of the first focal point $F1_{44}$ because the light is internally reflected by the elliptically-spherically-shaped-first reflecting surface 44. The first leftward/rightward emission regions 48*c* and the second leftward/rightward emission region 48*d* can be widely laterally illuminated to emit the light entering and passing through the first focal point $F1_{44}$ in different left and right directions. In addition, in the light emitting surface 48 of the embodiment, the concave-shaped-second leftward/rightward emission region 48*d* having is disposed at a central side thereof with respect to the forward/rearward reference axis $AX_{40}$, and the convex-shaped-first leftward/rightward emission regions 48*c* are disposed at the outer sides thereof. Accordingly, both left and right sides with respect to the forward/rearward reference axis $AX_{40}$ can be widely radiated. Further, in the light emitting surface 48, as the first leftward/rightward emission regions 48*c* and the second leftward/rightward emission region 48*d* are bilaterally symmetrically disposed with respect to the forward/rearward reference axis, a bilaterally symmetrical light distribution pattern with respect to the forward/rearward reference axis $AX_{40}$ can be formed.

According to the embodiment, among the light from the light source 26 in the incident surface 42, light having a predetermined angular range with respect to the optical axis $AX_{26}$ of the light source 26 is refracted in the concentration direction to enter the lens body. Accordingly, the incident angle of the light having the predetermined angular range with respect to the first reflecting surface 44 may be the critical angle or more. Further, as the optical axis $AX_{26}$ of the light source 26 is inclined with respect to the vertical axis V (see FIG. 1), the incident angle of the light from the light source 26 entering the lens body 40 with respect to the first reflecting surface 44 is the critical angle or more. That is, the light from the light source 26 can enter the first reflecting surface 44 at the incident angle of the critical angle or more. Accordingly, a reduction in cost can be achieved without needing a metal deposition on the first reflecting surface 44, and a reflection loss occurring in a vapor deposited surface can be suppressed to increase the utilization efficiency of the light.

In addition, according to the embodiment, the high beam light distribution pattern PA including the cutoff line CL can be formed at the lower edge. Accordingly, since the lighting tool 10 for a vehicle is used, brightness on a road surface near the vehicle corresponding to a region below the cutoff line CL can be suppressed. When the road surface near the vehicle is too bright, a region far from the vehicle is perceived as being relatively dark according to a driver. Since brightness near the vehicle is suppressed, the region far from the vehicle can be perceived as being sufficiently bright according to the driver.

While exemplary examples of the embodiment of the present invention has been above described and components of the embodiment, combinations thereof, and so on have been provided, additions, omissions, substitutions and other modifications of the components may be made without departing from the spirit of the present invention. In addition, the present invention is not limited by the embodiment.

For example, in the above-mentioned embodiment, the example in which the present invention is applied to the lens body 40 configured to form the high beam light distribution pattern PA (see FIG. 13) has been described. However, for example, the present invention may be applied to a lens body configured to form a light distribution pattern for a fog lamp, a lens body configured to form a light distribution pattern for a low beam, or another lens body.

In addition, in the above-mentioned embodiment, while the major axis $AX_{44}$ of the first reflecting surface 44 is inclined at the angle θ2 with respect to the forward/rearward reference axis $AX_{40}$, the embodiment is not limited thereto, and the major axis $AX_{44}$ (a major axis) of the first reflecting surface 44 may not be inclined with respect to the major axis $AX_{44}$ (i.e., the angle θ2=0° is possible). Even in the above-mentioned case, as a size of the light emitting surface 48 is increased, the light from the light source 26 internally reflected by the first reflecting surface 44 can be efficiently introduced thereto.

(Variant 1)

Figure 10:
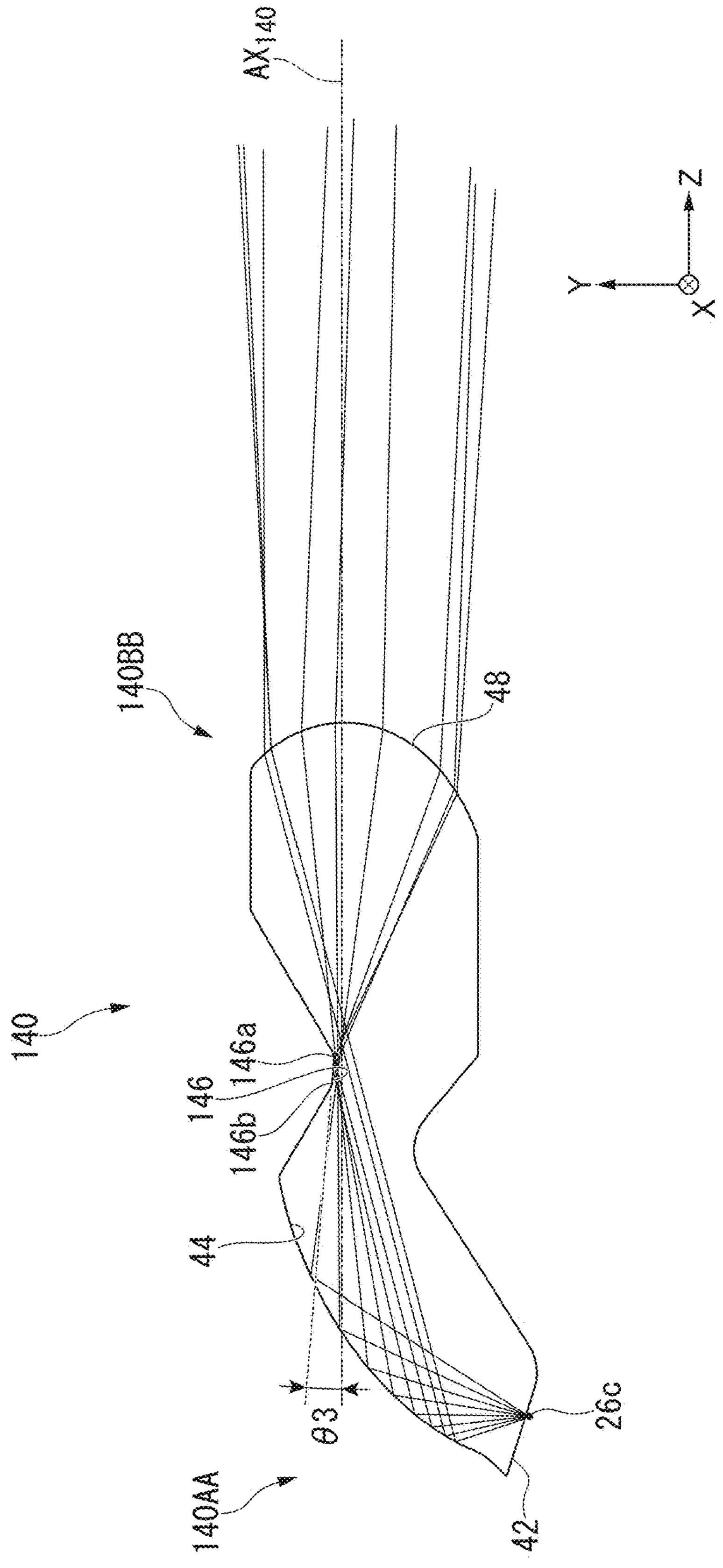
FIG. 10 is a cross-sectional view of a lens body of Variant 1 of the first embodiment along the YZ plane.

Next, a lens body 140 of Variant 1 of the first embodiment will be described. FIG. 10 is a schematic cross-sectional view of the lens body 140 and shows an optical path of light radiated from a light source rear end point 26*c*.

Further, components having the same shapes as the above-mentioned embodiment will be designated by the same reference numerals, and a description thereof will be omitted.

Like the lens body 40 of the above-mentioned embodiment, the lens body 140 of the variant has an incident surface (an incidence part) 42, a first reflecting surface 44, a second reflecting surface 146, and a light emitting surface 48. The incident surface 42 and the first reflecting surface 44 are disposed at a rear end portion 140AA of the lens body 140. In addition, the light emitting surface 48 is disposed at a front end portion 140BB of the lens body 140. The lens body 140 of the variant is mainly distinguished from the first embodiment in that a second reflecting surface 146 thereof is inclined at the angle θ3 with respect to a forward/rearward reference axis $AX_{140}$. Further, in the variant, the forward/rearward reference axis $AX_{140}$ is an axis extending in a forward/rearward direction (an X-axis direction) of a vehicle and serving as a reference passing a center of the light emitting surface 48 of the lens body 140. The forward/rearward reference axis $AX_{140}$ of the variant is an axis corresponding to the forward/rearward reference axis $AX_{40}$ of the first embodiment.

The second reflecting surface 146 is a surface configured to internally reflect (totally reflect) at least some of light from a light source 26 internally reflected by the first reflecting surface 44. The second reflecting surface 146 is constituted as a reflecting surface extending rearward from a point spaced a predetermined distance from a first focal point $F1_{44}$ in an upward direction. In the variant, the second reflecting surface 146 is inclined at an angle θ3 with respect to the forward/rearward reference axis $AX_{140}$ to be inclined downward as it goes from a rear side toward a front side. In the variant, the angle θ3 is, for example, 5°.

The angle θ3 of the second reflecting surface 146 with respect to the forward/rearward reference axis $AX_{140}$ is preferably determined such that among light from the light source 26, which is internally reflected by the first reflecting surface 44, light entering the second reflecting surface 146 is internally reflected by the second reflecting surface 146, and the reflected light is efficiently introduced into the light emitting surface 48. In the variant, in the forward/rearward reference axis $AX_{140}$, since the second reflecting surface 146 is formed to be inclined downward as it goes from a rear side thereof toward a front side thereof and a larger amount of light can be captured by the light emitting surface 48, light utilization efficiency is improved. That is, as shown in the variant, the angle θ3 of the second reflecting surface 146 with respect to the forward/rearward reference axis $AX_{140}$ is preferably set to an angle at which the light internally reflected by the second reflecting surface 146 can be sufficiently captured by the light emitting surface 48.

In addition, the angle θ3 of the second reflecting surface 146 with respect to the forward/rearward reference axis $AX_{140}$ is preferably set to an angle at which light reaching the light emitting surface 48 internally reflected by the first reflecting surface 44 without being internally reflected by the second reflecting surface 146 is not blocked. Similarly, a length of the second reflecting surface 146 in the forward/rearward direction (i.e., positions of a front edge 146*a* and a rear edge 146*b* of the second reflecting surface 146) is preferably set such that the light reaching the light emitting surface 48 internally reflected by the first reflecting surface 44 without being internally reflected by the second reflecting surface 146 is not blocked.

Example

Hereinafter, effects of the present invention can be made clearer by an example. Further, the present invention is not limited to the following example, but may be appropriately modified without departing from the spirit of the present invention.

(Simulation of First Embodiment)

In the lens body 40 of the above-mentioned first embodiment, simulation of the light distribution pattern with respect to an imaginary vertical screen facing the lens body 40 is performed.

Figure 11:
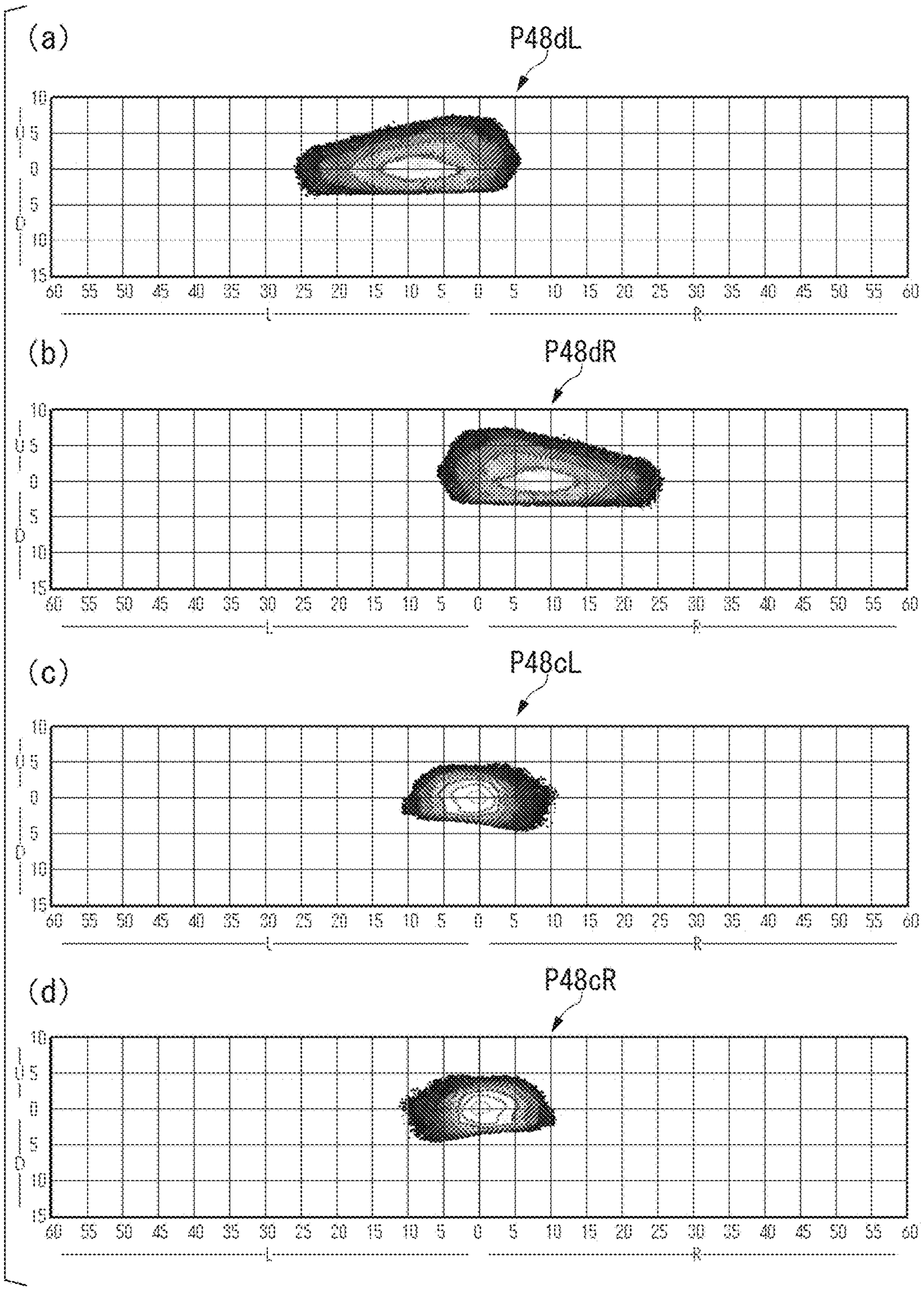
FIG. 11 shows a light distribution pattern of light radiated from different regions of a light emitting surface of the lens body of the first embodiment.

FIGS. 11(*a*) to 11(*d*) show light distribution patterns of light radiated from different regions of the light emitting surface 48 of the lens body 40.

FIG. 11(*a*) shows a light distribution pattern P48*d*L of light radiated from the second leftward/rightward emission region 48*d* disposed at a left side of the forward/rearward reference axis $AX_{40}$ when seen from above.

FIG. 11(*b*) shows a light distribution pattern P48*d*R of light radiated from the second leftward/rightward emission region 48*d* disposed at a right side of the forward/rearward reference axis $AX_{40}$ when seen from above.

FIG. 11(*c*) shows a light distribution pattern P48*c*L of light radiated from the first leftward/rightward emission region 48*c* disposed at the left side of the forward/rearward reference axis $AX_{40}$ when seen from above.

FIG. 11(*d*) shows a light distribution pattern P48*c*R of light radiated from the first leftward/rightward emission region 48*c* disposed at the right side of the forward/rearward reference axis $AX_{40}$ when seen from above.

As shown in FIGS. 11(*a*) to 11(*d*), it will be apparent that the light radiated from the regions has distributions in different directions.

Figure 12:
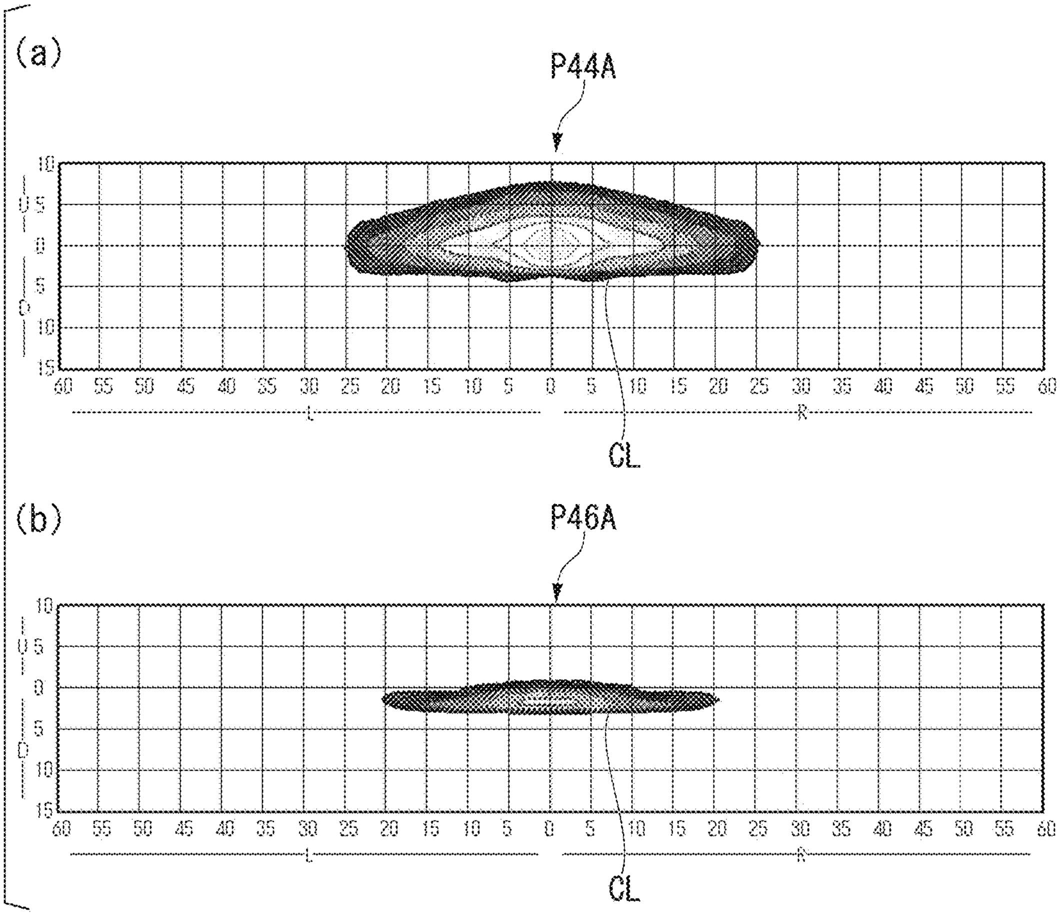
FIG. 12 shows a light distribution pattern of light that traces an optical path that is not internally reflected by a second reflecting surface, and a light distribution pattern of light that traces an optical path that is internally reflected in the lens body of the first embodiment.

FIG. 12(*a*) shows a light distribution pattern P44A of the light radiated forward from the light emitting surface 48 among the light entering from the incident surface 42 of the lens body 40 and totally reflected by the first reflecting surface 44 without being reflected by the second reflecting surface 46.

FIG. 12(*b*) shows a light distribution pattern P46A of the light radiated forward from the light emitting surface 48 among the light entering from the incident surface 42 of the lens body 40, totally reflected by the first reflecting surface 44, and also totally reflected by the second reflecting surface 46.

Lower end lines of the light distribution pattern P44A of FIG. 12(*a*) and the light distribution pattern P46A of FIG. 12(*b*) substantially coincide with each other and constitute the cutoff line CL. In addition, the light distribution pattern P46A of FIG. 12(*b*) is configured to be turned upward from a lower side using the cutoff line CL as a reference line since the light is totally reflected by the second reflecting surface 46 in the lens body 40.

Figure 13:
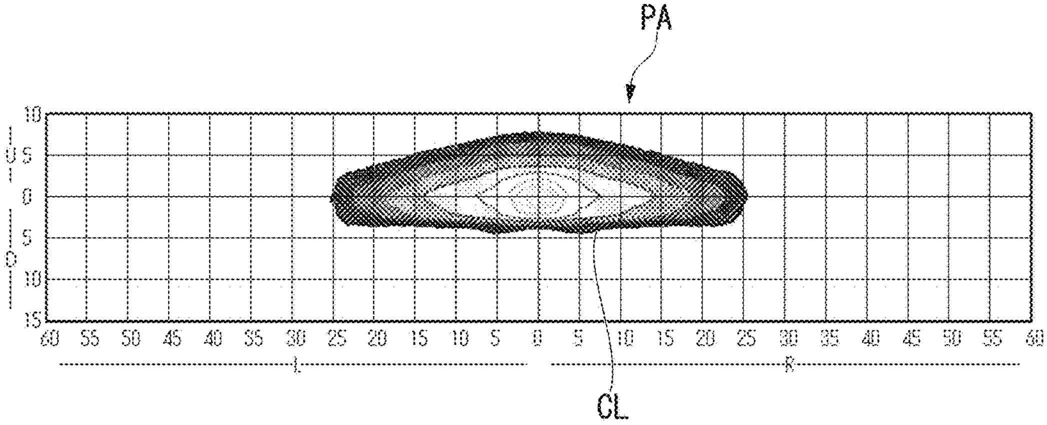
FIG. 13 shows a light distribution pattern of the light emitting surface of the lens body of the first embodiment.

FIG. 13 shows a simulation result of a light distribution pattern PA of light radiated toward an imaginary vertical screen facing the lens body 40 in front of the lens body 40. The light distribution pattern PA is a light distribution pattern in which the light distribution patterns P48*d*L, P48*d*R, P48*c*L and P48*c*R of FIGS. 11(*a*) to 11(*d*) overlap each other. In addition, the light distribution pattern PA is a light distribution pattern in which the light distribution patterns P44A and P46A of FIGS. 12(*a*) and 12(*b*) overlap each other.

As shown in FIG. 13, it should be apparent that the light distribution pattern PA can illuminate a forward side in a wide and balanced manner. In addition, it was confirmed that the cutoff line CL was formed at the lower edge in the light distribution pattern PA.

(Simulation of Variant of First Embodiment)

In the lens body 140 of the above-mentioned variant, simulation of the light distribution pattern with respect to an imaginary vertical screen facing the lens body 140 was performed.

Figure 14:
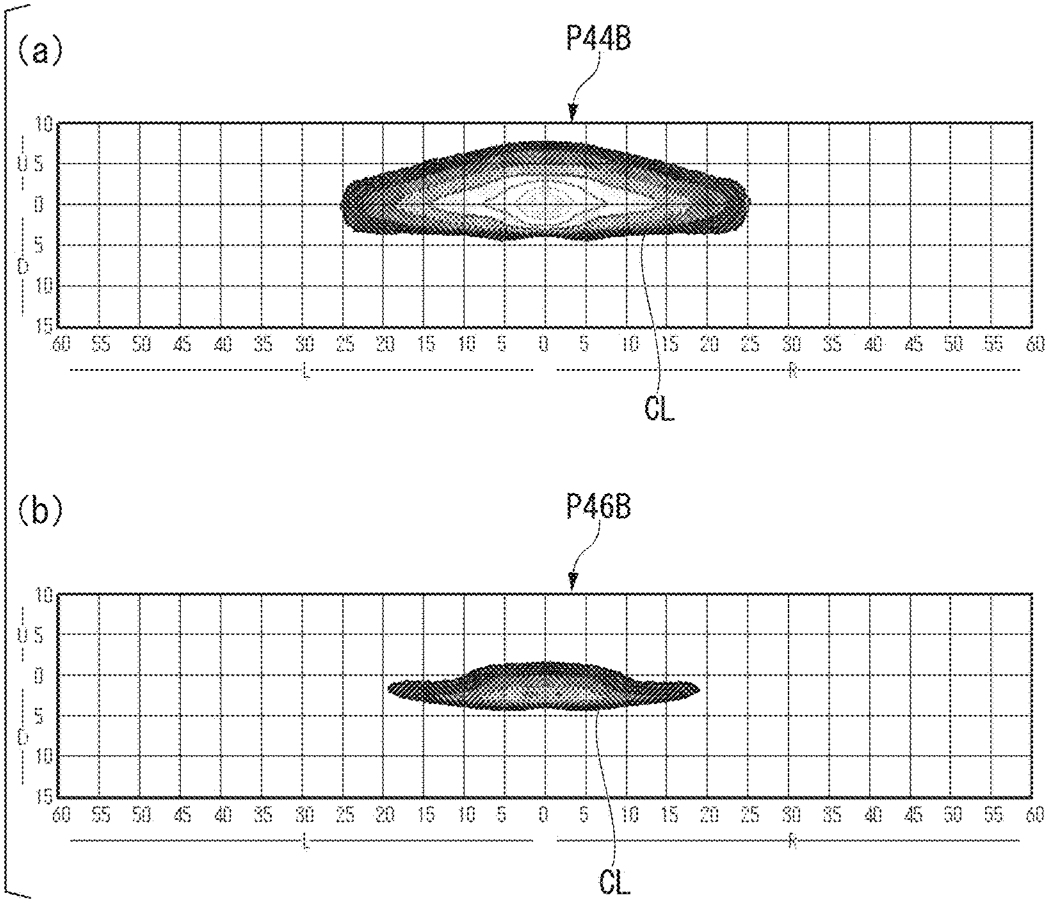
FIG. 14 shows a light distribution pattern of light that traces an optical path that is not internally reflected by a second reflecting surface, and a light distribution pattern of light that traces an optical path that is internally reflected in a lens body of Variant 1 of the first embodiment.

FIG. 14(*a*) shows a light distribution pattern P44B of the light radiated forward from the light emitting surface 48 among the light entering from the incident surface 42 of the lens body 140 and totally reflected by the first reflecting surface 44 without being reflected by the second reflecting surface 146.

FIG. 14(*b*) shows a light distribution pattern P146B of the light radiated forward from the light emitting surface 48 among the light entering from the incident surface 42 of the lens body 140, totally reflected by the first reflecting surface 44, and also totally reflected by the second reflecting surface 146.

Lower end lines of the light distribution pattern P44B of FIG. 14(*a*) and the light distribution pattern P146B of FIG. 14(*b*) substantially coincide with each other to constitute the cutoff line CL.

Figure 15:
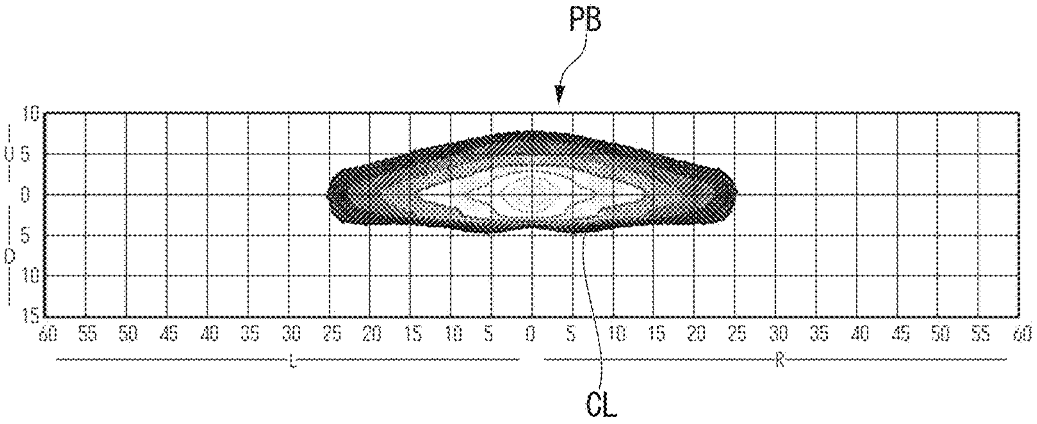
FIG. 15 shows a light distribution pattern of a light emitting surface of the lens body of Variant 1 of the first embodiment.

FIG. 15 shows a simulation result of a light distribution pattern PB of light radiated toward an imaginary vertical screen facing the lens body 140 in front of the lens body 140. The light distribution pattern PB is a light distribution pattern in which the light distribution patterns P44B and P146B of FIGS. 14(*a*) and 14(*b*) overlap each other.

As shown in FIG. 15, it should be apparent that the light distribution pattern PB can illuminate a forward side in a wide and balanced manner. In addition, it was confirmed that the cutoff line CL was formed at the lower edge in the light distribution pattern PB.

While preferred embodiments of the invention have been described and illustrated above, it should be understood that they are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A lens body disposed in front of a light source and configured to emit light forward from the light source along a forward/rearward reference axis extending in a forward/rearward direction of a vehicle, the lens body comprising:

an incidence part configured to cause light from the light source to enter an inside of the lens body;

a first reflecting surface configured to totally reflect the light entering from the incidence part;

a second reflecting surface configured to totally reflect at least some of the light totally reflected by the first reflecting surface; and a light emitting surface configured to emit light forward passing through the inside, wherein the first reflecting surface comprises an elliptical spherical shape rotationally symmetrical with respect to a major axis extending in the forward/rearward direction, wherein the major axis of the first reflecting surface is inclined with respect to the forward/rearward reference axis, wherein the elliptical spherical shape of the first reflecting surface, constitutes first and second focal points, wherein the second focal point is disposed near the light source at a position rearward of the first focal point and lower than the first focal point, wherein the second reflecting surface extends rearward from a point spaced a predetermined distance from the first focal point in an upward direction, the second reflecting surface faces downward, and among the light totally reflected by the first reflecting surface, light reaching the light emitting surface without being reflected by the second reflecting surface and light reaching the light emitting surface after being totally reflected by the second reflecting surface are emitted from the light emitting surface to be radiated forward.

2. The lens body according to claim 1, wherein the light emitting surface has:

a convex shape having an optical axis parallel to the forward/rearward reference axis in a cross section along a surface perpendicular to a leftward/rightward direction of the vehicle using a point disposed near the first focal point as a light emitting surface focal point; and a first leftward/rightward emission region and a second leftward/rightward emission region neighboring each other in the leftward/rightward direction in a cross section along a surface perpendicular to an upward/downward direction of the vehicle, wherein the first leftward/rightward emission region refracts light entering the incidence part and passing through the first focal point in a direction approaching the forward/rearward reference axis, and wherein the second leftward/rightward emission region refracts the light entering the incidence part and passing through the first focal point in a direction receding from the forward/rearward reference axis.

3. The lens body according to claim 2, wherein the light emitting surface has a surface shape configured such that light passing near the first focal point is emitted in a direction substantially parallel to the forward/rearward reference axis in at least a vertical direction.

4. The lens body according to claim 2, wherein the light emission surface has two first leftward/rightward emission regions and one second leftward/rightward emission region, wherein the two first leftward/rightward emission regions are located on both sides in the horizontal direction of the second leftward/rightward emission region;

the second leftward/rightward emission region constitutes a concave shape in which a central portion thereof is recessed when seen in the upward/downward direction, and the two first leftward/rightward emission region constitutes convex shapes disposed at both sides of the second leftward/rightward emission region in the leftward/rightward direction.

5. The lens body according to claim 1, wherein, in the first reflective surface, a distance between the first focal point and the second focal point, eccentricity of the first reflecting surface, an angle between the major axis of the first reflecting surface and the forward/rearward reference axis, and an angle between an optical axis of the light source and the forward/rearward reference axis are set to totally reflect light using the first reflecting surface.

6. The lens body according to claim 1, wherein the second reflecting surface has an angle set with respect to the forward/rearward reference axis such that, among the light totally reflected by the first reflecting surface, the light totally reflected by the second reflecting surface is captured by the light emitting surface.

7. The lens body according to claim 6, wherein the second reflecting surface has an angle with respect to the forward/rearward reference axis and a length in the forward/rearward direction which are set such that light reaching the light emitting surface and totally reflected by the first reflecting surface without being totally reflected by the second reflecting surface is not blocked.

8. A lighting tool for a vehicle comprising:
the lens body according to claim 1; and the light source.

* * * * *